Figure 1:
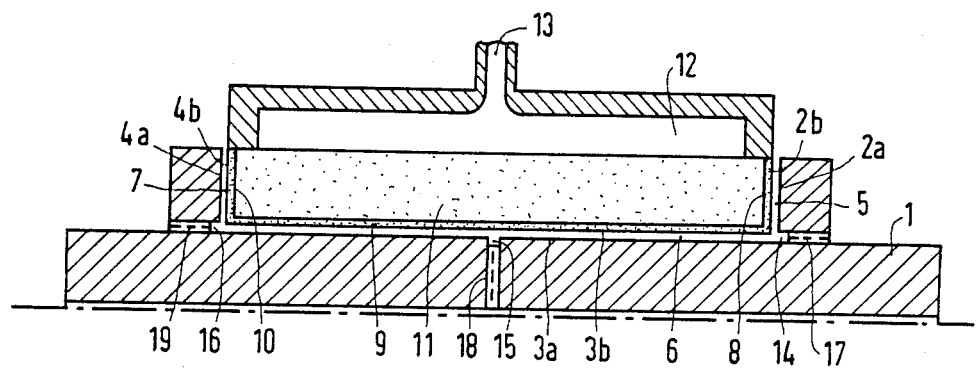

United States Patent [19]

Tittizer

[11] Patent Number: 4,715,731
[45] Date of Patent: Dec. 29, 1987

[54] GAS BEARING

[75] Inventor: Gabriel Tittizer, Rösrath-Hoffnungstal, Fed. Rep. of Germany

[73] Assignee: Interatom GmbH, Bergisch Gladbach, Fed. Rep. of Germany

[21] Appl. No.: 871,703

[22] Filed: Jun. 6, 1986

[30] Foreign Application Priority Data

Jun. 10, 1985 [DE] Fed. Rep. of Germany ....... 3520717
Aug. 26, 1985 [DE] Fed. Rep. of Germany ....... 3530437

[51] Int. Cl.$^4$ .................. F16C 32/06; F16C 33/06
[52] U.S. Cl. ................... 384/100; 384/107; 384/110; 384/279; 384/902
[58] Field of Search ................ 384/100, 107–116, 384/279, 902

[56] References Cited

U.S. PATENT DOCUMENTS

| | | | |
|---|---|---|---|
| 2,227,307 | 12/1940 | Hildabolt | 384/279 |
| 2,696,410 | 12/1954 | Topanelian, Jr. | 384/107 |
| 2,995,462 | 8/1961 | Mitchell et al. | 384/902 |
| 3,171,295 | 3/1965 | Benckert | |
| 3,445,148 | 5/1969 | Harris et al. | 384/279 |
| 3,472,565 | 10/1969 | Arneson | 384/113 |
| 3,527,510 | 9/1970 | Christiansen | 384/114 |
| 3,657,782 | 4/1972 | Mott | |
| 3,763,534 | 10/1973 | Conroy et al. | 384/111 X |

FOREIGN PATENT DOCUMENTS

| | | | |
|---|---|---|---|
| 3230232 | 2/1984 | Fed. Rep. of Germany | |
| 1524941 | 4/1968 | France | |
| 119218 | 9/1980 | Japan | 384/114 |
| 50314 | 3/1983 | Japan | 384/114 |
| 688152 | 2/1953 | United Kingdom | 384/114 |
| 724603 | 2/1955 | United Kingdom | |
| 1118366 | 7/1968 | United Kingdom | |

Primary Examiner—Stuart S. Levy
Assistant Examiner—Thomas R. Hannon
Attorney, Agent, or Firm—Herbert L. Lerner; Laurence A. Greenberg

[57] ABSTRACT

A gas bearing and shaft assembly includes complementary sets of guiding surfaces formed on the gas bearing and the shaft being mutually spaced apart defining bearing gaps therebetween, at least one guiding surface of each of the sets being a porous gas passage surface, a thin-porous layer adjoining the gas passage surface, a component having a given region disposed upstream of the gas passage surface in flow direction of gas fed under pressure through the component to the gas passage surface and the component having other porous gas-permeable regions, the gas passage surface and the thin porous layer together being denser than the other gas-permeable regions of the component producing a pressure drop at the thin porous layer being substantially greater than at the other gas-permeable regions, and gas outlet paths in communication with the bearing gaps within the bearing.

18 Claims, 5 Drawing Figures

GAS BEARING

The invention relates to a gas bearing and a shaft, comprising complementary sets of guiding surfaces formed on the gas bearing and the shaft being mutually spaced apart defining bearing gaps therebetween, at least one guiding surface of each of the sets being a porous gas passage surface, a thin-porous layer adjoining or adjacent the gas passage surface, and a component or material having a given region disposed upstream of the gas passage surface in flow direction of gas fed under pressure through the component to the gas passage surface and the component having other porous gas-permeable regions, the gas passage surface and the thin porous layer together being considerably denser than the other gas-permeable regions of the component producing a pressure drop at the thin porous layer being substantially greater than at the other gas-permeable regions.

The basic construction of such a bearing is known from German Published, Non-Prosecuted Application DE-OS No. 32 30 232. In that publication, reference is made to the vibration-damping effect of a denser surface layer. A gas bearing for a spindle is also already known from U.S. Pat. No. 3,171,295, in which the gas flows outward through the interior of a porous spindle and provides a gas bearing support within a nut. However, vibration problems are not discussed in this publication and the support of smooth and possibly fast-running shafts is also not dealt with.

It is accordingly an object of the invention to provide a gas bearing which overcomes the hereinafore-mentioned disadvantages of the heretofore-known devices of this general type and which has particularly good bearing properties and is particularly well suited for special bearing problems, especially for the support of very fast rotating shafts. In addition, the basic structure of the bearing should permit radial as well as axial guidance of the shaft.

With the foregoing and other objects in view there is provided, in accordance with the invention, a gas or static gas bearing and shaft assembly, comprising complementary sets of guiding surfaces formed on the gas bearing and the shaft being mutually spaced apart defining bearing gaps therebetween, at least one guiding surface of each of the sets being a porous gas passage surface, a thin-porous layer adjoining or adjacent the gas passage surface, a component or material having a given region disposed upstream of the gas passage surface in flow direction of gas fed under pressure through the component to the gas passage surface and the component having other porous gas-permeable regions, the gas passage surface and the thin porous layer together being considerably denser than the other gas-permeable regions of the component producing a pressure drop at the thin porous layer being substantially greater than at the other gas-permeable regions, and gas outlet paths in communication with the bearing gaps within the bearing. This bearing not only has gas outlets at the ends of the bearing gaps but also has gas outlet paths in the interior of the bearing which are in communication with the bearing gap. Analytical considerations have shown that the dynamic properties of a bearing depend very substantially on the gas outlet paths. It is therefore not sufficient for many applications to provide gas outlet paths at the end of bearing gaps which could be very long. Especially in the case of more complicated geometries of the bearing gaps which occur when axially and radially supporting the shaft, the gas flow in the bearing gap is distinctly impeded at bends, which can be compensated for by providing additional gas outlet paths.

The explanations given above and below relate to the possibility of supplying the gas from the outside through the bearing shell into the bearing gap as well as the possibility of supplying the gas through a hollow and/or porous shaft from the inside into the bearing gap. In addition, the considerations always apply similarly to a stationary shaft with rotating bearings.

In accordance with another feature of the invention, the guiding surfaces support the shaft in radial and axial directions. This embodiment, which is novel in its own right without requiring the other features of the invention, can only be explained through its function, since the gas outlet surfaces must take over by far the largest part of the pressure drop in the bearing. Due to this embodiment, the length of the paths which the gas must travel within the porous parts no longer has an effect on the pressure at the gas outlet surfaces. On the contrary, approximately the same pressure prevails at all gas outlet surfaces regardless of their form. It is, however, possible to provide more complicated bearing geometries, in which radial as well as axial guiding forces can be exerted on a suitably shaped shell.

The guiding surfaces can also be constructed in this case in such a manner that their guiding forces have components in the radial and/or axial direction.

For instance, in accordance with an additional feature of the invention, the bearing includes a double-conical bearing shell and the bearing gaps are V-shaped as seen in longitudinal direction.

In accordance with an added feature of the invention, the shaft has a double-conical shape and the bearing gaps are V-shaped as seen in longitudinal direction.

In accordance with a further feature of the invention, the bearing includes a bearing shell, and at least one of the shaft and the bearing shell have at least one projection formed thereon being wider than the bearing gaps, the at least one projection having lateral surfaces forming the guiding surfaces guiding or supporting the shaft in axial direction.

In accordance with yet another feature of the invention, the guiding surfaces guiding or supporting the shaft in axial direction and the thin porous layer have different porosities depending on desired axial and radial guiding forces and corresponding area ratios of the guiding surfaces. The fact that nearly the same pressure prevails at the gas outlet surfaces independently of their exact form makes it possible to equip the guiding surfaces which serve for the radial guidance and the guiding surfaces which serve for the axial guidance with different porosities. This construction was also not possible without causing problems in the conventional gas bearings without a denser gas outlet layer. In homogeneous porous materials, the pressure at individual points of the gas outlet surfaces is reciprocally proportional to the path traveled by the gas in the porous body. This no longer applies to the construction according to the invention so that there is very great flexibility with respect to the form and the properties of the bearings.

In accordance with yet an added feature of the invention, the bearing includes a bearing shell and the gas outlet paths are formed in at least one of the shaft and/or the bearing shell.

In accordance with yet an added feature of the invention, the gas outlet paths include slots extending in at least one of axial and/or circumferential directions as well as holes connecting the slots to the surroundings or environment or to a gas plenum.

In accordance with yet a further feature of the invention, the bearing gaps include bends or long straight sections, and the gas outlet paths are disposed in the vicinity of the bends or the long straight sections.

In accordance with again another feature of the invention, the bearing has ends and an interior, and the guiding surfaces guiding or supporting the shaft in axial direction are disposed at the ends or in the interior of the bearing. Regarding the dynamic properties of the bearing, it is important for the bearing gaps which serve for the radial support to have gas outlet paths of their own without the necessity of the gas first flowing through longer sections and around bends.

In accordance with again an additional feature of the invention, the axial longitudinal slots are mutually spaced apart by different spacings and distributed over the periphery of the bearing. Gas outlet slots which extend in the axial direction and are open toward the bearing gap reduce the tendency of the shaft to vibrate and tumble, especially if they are distributed over the circumference at irregular spacings. In addition particularly simple gas outlet paths for the gas outlet slots extending in the circumferential direction are provided by axial slots.

Otherwise, there is great freedom in the construction of the bearing which can account for the respective placement of the gas outlet paths as well as for the placement of the axial and radial guiding surfaces. In particular, the radial guiding surfaces can have different diameters, which reduces the tendency of the bearing to vibrate.

In accordance with again an added feature of the invention, the bearing is formed of at least two form-lockingly interconnected rotation-symmetrical parts having a slot and key connection or the like. For the assembly of bearings with axial guiding surfaces, it may be necessary to use bearings formed of several parts which are inserted one after the other or slipped on a shaft. A bearing can be subdivided into several regions by taking structural considerations into account. If the parts are made with sufficiently small tolerances, the bearing properties are not adversely affected thereby.

In accordance with still another feature of the invention, the slots are in the form of at least two, three or more axial longitudinal slots.

In accordance with still a further feature of the invention, the parts have parting surfaces being porous enough to permit unimpeded gas exchange therebetween.

In accordance with a concomitant feature of the invention, the parting surfaces have cavities formed therein. In this manner it is even possible to feed-in the gas only in a small outer region of a section of the bearing without disturbing the pressure conditions in the interior of the bearing. The gas can therefore flow through the parting gaps or cavities from one part of the bearing into the other, so that approximately the same pressure prevails again at the considerably denser gas outlet surfaces.

Other features which are considered as characteristic for the invention are set forth in the appended claims.

Although the invention is illustrated and described herein as embodied in a gas bearing, it is nevertheless not intended to be limited to the details shown, since various modifications and structural changes may be made therein without departing from the spirit of the invention and within the scope and range of equivalents of the claims.

Figure 2:
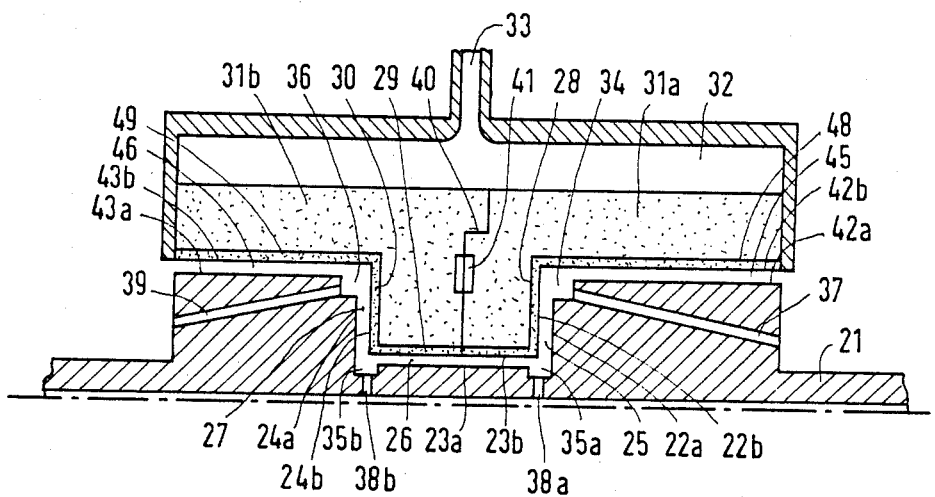
Figure 3:
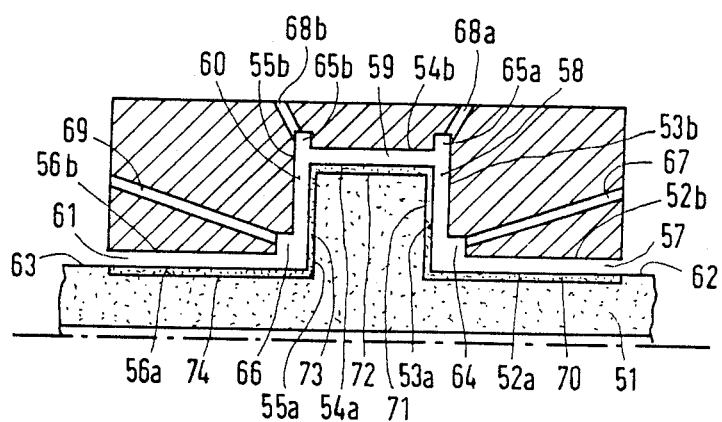
Figure 4:
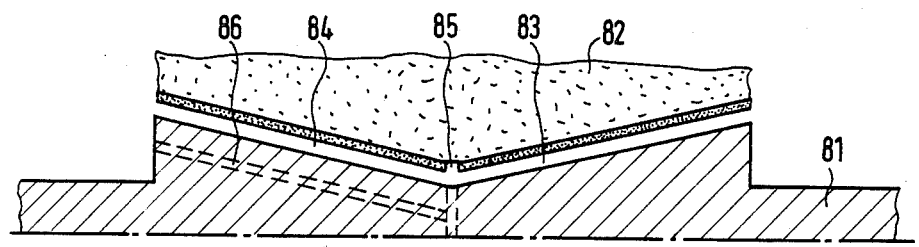
Figure 5:
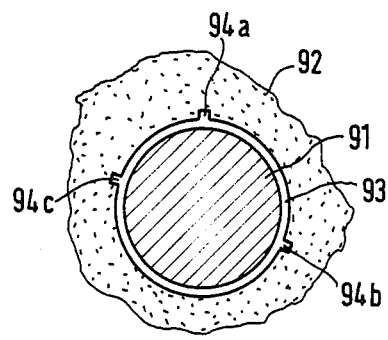

The construction and method of operation of the invention, however, together with additional objects and advantages thereof will be best understood from the following description of specific embodiments when read in connection with the accompanying drawings, in which:

FIGS. 1, 2, 3 and 4 are fragmentary, diagrammatic, axial-longitudinal sectional views of one half of gas bearings constructed according to different embodiments of the invention; the bearings according to FIGS. 1, 2 and 4 having a gas flow inward from the outside and the bearing of FIG. 3 having a gas flow outward through the shaft; and FIG. 5 is a fragmentary, cross-sectional view through an inner part of a bearing with axial gas outlet slots.

Referring now to the figures of the drawings in detail and first, particularly, to FIG. 1 thereof, there is seen a shaft 1 supported in a surrounding bearing shell 11.

Gas flows through an inlet 13 into a gas supply space 12 and from there through the interior of the porous bearing shell 11 to gas outlet or passage surfaces 2b, 3b, 4b. The gas outlet surfaces 2b, 3b, 4b and adjoining thin, porous surface layers 8, 9, 10 are considerably denser than the remaining bearing shells 11 so that a pressure drop actually takes place in these surface layers 8, 9, 10. The respective outlet surfaces 2b, 3b, 4b of the bearing shell 11 are opposite guiding surfaces 2a, 3a, 4a of the shaft 1. The outlet and guiding surface may be referred to as a whole as complimentary guiding surfaces. Bearing gaps 5, 6, 7 are located between these surfaces. The guiding and outlet surfaces 3a, 3b provide radial guidance of the bearing, as is known from the state of the art, while the guiding and outlet surfaces 2a, 2b and 4a, 4b form the axial support of the shaft 1, which would have to lead to a deterioration of the radial bearing properties without the denser surface layers 8, 9, 10. Furthermore, due to the presence of the denser surface layers 8, 9, 10, the more complicated form of the bearing gaps 5, 6, 7 can make the dynamic properties of the bearings poorer since gas can no longer flow in an unimpeded manner from the gap 6 which serves for the radial support. In order to remedy this, the bearing according to the invention provides gas outlet paths 14, 15, 16, 17, 18, 19, through which the gas can additionally flow from the bearing gaps 5, 6, 7. The gas outlet paths are formed of annular slots 14, 15, 16 and holes 17, 18, 19 through which the slots are in communication with the environment or a gas plenum. If the bearing gap 6 which serves for the radial support is not especially long and in particular if it is smaller than the diameter of the shaft 1, the gas outlet path 15, 18 in the vicinity thereof can be dispensed with. In any event, the illustrated path can only be provided if the shaft 1 is hollow. Otherwise, the additional gas outlet paths can, of course, be conducted back through the bearing shell 11 by suitable means as well. As mentioned above, the bearing shown in FIG. 1 has guiding and outlet surfaces 2a, 2b, 4a, 4b at the ends of the bearing which serve for axial guidance. This is a very simple embodiment, but not the only possible one.

FIG. 2 shows a bearing which has axial guiding and outlet surfaces 22a, 22b, 24a, 24b in the interior of the bearing. Otherwise, the function of most of the parts correspond to those described with reference to FIG. 1. Gas is transported through a gas inlet 33 into a gas feeding space 32 and through a porous bearing shell 31a, 31b to gas outlet surfaces 22b, 23b, 24b, 42b, 43b and to dense layers 28, 29, 30, 48, 49 following them. In this embodiment, the bearing shell is divided into two parts, namely the parts 31a, 31b which are held together by a form-locking connection 40. A form-locking connection is one which is accomplished by the shape of the parts themselves, as opposed to a force-locking connection requiring external force. Generally, an unimpeded gas exchange can take place through the parting surfaces of the parts 31a, 31b. Should this not be possible in an individual case due to certain machining steps, specially machined cavities 41 can be provided between the bearing parts 31a, 31b, through which a gas exchange is possible in every case. However, in the illustrated embodiment the gas exchange is not important because both parts 31a, 31b of the bearing shell are in communication with the gas inlet or feeding space 32. However, in the case of specially shaped, more complicated bearings, a gas exchange at the parting surfaces of different bearing parts may be necessary.

The complementary guiding surfaces 22a, 23a, 24a, 42a, 43a are disposed opposite the gas outlet surfaces 22b, 23b, 24b, 42b, 43b defining bearing gaps 25, 26, 27, 45, 46 between the guiding and outlet surfaces. Additional gas outlet paths in the form of annular slots 34, 35a, 35b, 36 and corresponding holes 37, 38a, 38b, 39 connected thereto shorten the gas outlet paths and thereby improve the dynamic properties of the bearing.

Another embodiment of the invention is shown in FIG. 3, which illustrates a bearing with gas fed through the interior of a shaft 51. The shaft 51 which is porous at least in the vicinity of the bearing, is acted upon from the inside by pressurized gas through a non-illustrated device. As in the bearing shells described above, the gas is transported to gas outlet surfaces 52a, 53a, 54a, 55a, 56a and to denser layers 70, 71, 72, 73, 74 following them. Opposite the gas outlet surfaces 52a, 53a, 54a, 55a, 56a are complementary guiding surfaces 52b, 53b, 54b, 55b, 58b. The outflowing gas can escape through bearing gaps 57, 58, 59 60, 61 in between. Additional gas outlet paths in the form of annular slots 64, 65a, 65b, 66 and corresponding gas outlet holes 67, 68a, 68b, 69 improve the dynamic properties of the bearing.

In the three embodiments described above it is possible to equip the radial guiding surfaces with a porosity different from that of the axial guiding surfaces. If several different surfaces are available for one of the two kinds of guides, they too can be constructed with porosities that are different from each other. Thus, it is also possible, for instance, to completely seal the gas outlet surface 23b in FIG. 2 so that the bearing gap 26 does not contribute to the radial bearing support. Such measures depend on the respective requirements as to the properties of the bearing and on the physical situation.

FIG. 4 diagrammatically illustrates the interior of a bearing according to the invention in an axial, longitudinal half-section. Bearing gaps 83, 84 together form a V-shaped and thus together provide radial and axial support, the distribution of the guiding forces depending on the axial and radial support as a function of the bearing gaps 83, 84. A gas outlet path in the form of a circumferential slot 85 and outlet holes 86 is provided at the bend between the bearing gaps 83, 84. In the vicinity of the bearings, a shaft 81 has the shape of two truncated cones abutting at the upper surfaces thereof.

FIG. 5 shows the disposition of axial gas outlet slots 94a, 94b, 94c in a bearing shell 92 with the aid of a cross section through a bearing according to the invention. If a shaft 91 rotates, disturbing co-rotating gas cushions can be broken down in a gap 93. In order to avoid vibrations, it is advantageous to form the axial slots 94a, 94b, 94c at irregular spacings about the periphery.

Gas bearings according to the invention are particularly well suited for use in high-speed shafts such as in turbines or the like.

I claim:

1. Gas bearing and shaft assembly, comprising means for supporting the shaft in radial and axial directions in the form of complementary sets of guiding surfaces formed on the gas bearing and the shaft being mutually spaced apart defining bearing gaps therebetween, at least one guiding surface of each of said sets being a porous gas passage surface, a thin-porous layer adjoining said gas passage surface, a component having a given region disposed upstream of said gas passage surface in flow direction of gas fed under pressure through said component to said gas passage surface and said component having other porous gas-permeable regions, said gas passage surface and said thin porous layer together being denser than said other gas-permeable regions of said component and producing a pressure drop at said thin porous layer substantially greater than at said other gas-permeable regions, and gas outlet paths in communication with said bearing gaps within the bearing.

2. Gas bearing and shaft assembly according to claim 1, wherein the bearing includes a bearing shell, and at least one of the shaft and said bearing shell have at least one projection formed thereon being wider than said bearing gaps, said at least one projection having lateral surfaces forming said guiding surfaces supporting the shaft in axial direction.

3. Gas bearing and shaft assembly according to claim 2, wherein the bearing has ends, and said guiding surfaces supporting the shaft in axial direction are disposed at said ends of the bearing.

4. Gas bearing and shaft assembly according to claim 2, wherein the bearing has an interior, and said guiding surfaces supporting the shaft in axial direction are disposed in said interior of the bearing.

5. Gas bearing and shaft assembly according to claim 1, wherein said guiding surfaces and said thin porous layer have different porosities depending on desired axial and radial guiding forces and corresponding area ratios of said guiding surfaces.

6. Gas bearing and shaft assembly according to claim 1, wherein said guiding surfaces supporting the shaft in axial direction and said thin porous layer have different porosities depending on desired axial and radial guiding forces and corresponding area ratios of said guiding surfaces.

7. Gas bearing and shaft asseembly according to claim 1, wherein the bearing includes a bearing shell and said gas outlet paths are formed in at least one of the shaft and said bearing shell.

8. Gas bearing and shaft assembly according to claim 1, wherein said gas outlet paths include slots extending in at least one of axial and circumferential directions as well as holes connecting said slots to the surroundings.

9. Gas bearing and shaft assembly according to claim 8, wherein said slots are in the form of at least two axial longitudinal slots.

10. Gas bearing and shaft assembly according to claim 9, wherein said axial longitudinal slots are mutually spaced apart by different spacings and distributed over the periphery of the bearing.

11. Gas bearing and shaft assembly according to claim 1, wherein said bearing gaps include bends, and said gas outlet paths are disposed in the vicinity of said bends.

12. Gas bearing and shaft assembly according to claim 1, wherein said bearing gaps include long straight sections, and said gas outlet paths are disposed in the vicinity of said long straight sections.

13. Gas bearing and shaft assembly according to claim 1, wherein the bearing includes a double-conical bearing shell and said bearing gaps are V-shaped as seen in longitudinal direction.

14. Gas bearing and shaft assembly according to claim 1, wherein the shaft has a double-conical shape and said bearing gaps are V-shaped as seen in longitudinal direction.

15. Gas bearing and shaft assembly according to claim 1, wherein the bearing is formed of at least two interconnected rotation-symmetrical parts.

16. Gas bearing and shaft assembly according to claim 15, wherein said parting surfaces have cavities formed therein.

17. Gas bearing and shaft assembly according to claim 15, wherein said parts have parting surfaces being porous enough to permit unimpeded gas exchange therebetween.

18. Gas bearing and shaft assembly according to claim 17, wherein said parting surfaces have cavities formed therein.

* * * * *